(12) United States Patent
Skali et al.

(10) Patent No.: US 10,262,171 B2
(45) Date of Patent: Apr. 16, 2019

(54) DEVICE FOR IDENTIFYING AN OBJECT COMPRISING A LABEL

(71) Applicants: Saad Skali, Lyons (FR); Christophe Medina, Valence (FR)

(72) Inventors: Saad Skali, Lyons (FR); Christophe Medina, Valence (FR)

( * ) Notice: Subject to any disclaimer, the term of this patent is extended or adjusted under 35 U.S.C. 154(b) by 0 days.

(21) Appl. No.: 15/765,423

(22) PCT Filed: Oct. 3, 2016

(86) PCT No.: PCT/FR2016/052527
§ 371 (c)(1),
(2) Date: Apr. 2, 2018

(87) PCT Pub. No.: WO2017/055780
PCT Pub. Date: Apr. 6, 2017

(65) Prior Publication Data
US 2018/0307879 A1 Oct. 25, 2018

(30) Foreign Application Priority Data
Oct. 2, 2015 (FR) ...................................... 15 59404

(51) Int. Cl.
*G06F 1/16* (2006.01)
*G06K 7/10* (2006.01)
*H04M 1/18* (2006.01)
*H04M 1/725* (2006.01)

(52) U.S. Cl.
CPC ....... *G06K 7/10386* (2013.01); *G06F 1/1635* (2013.01); *G06F 1/1656* (2013.01); *G06K 7/10881* (2013.01); *H04M 1/185* (2013.01); *H04M 1/72527* (2013.01)

(58) Field of Classification Search
None
See application file for complete search history.

(56) References Cited

U.S. PATENT DOCUMENTS

| 8,832,323 | B2 | 9/2014 | Lee |
| 2013/0109316 | A1 | 5/2013 | Lee |
| 2013/0206844 | A1 | 8/2013 | Chen et al. |

FOREIGN PATENT DOCUMENTS

WO 2013/106991 A1 7/2013

*Primary Examiner* — Kristy A Haupt
(74) *Attorney, Agent, or Firm* — Oliff PLC

(57) ABSTRACT

A device including a case including a first housing demarcating a first accommodating volume designed to receive a PDA phone; a data capture module configured to capture data from the tag of the object; connection means configured to electrically connect the data capture module and the PDA phone; the device being remarkable in that the case includes a second housing demarcating a second accommodating volume, and in that the data capture module is arranged inside the second housing, in the second accommodating volume.

15 Claims, 2 Drawing Sheets

US 10,262,171 B2

DEVICE FOR IDENTIFYING AN OBJECT COMPRISING A LABEL

FIELD OF THE INVENTION

The present invention relates to an identification device of an object, the object comprising a tag. The present invention falls within the scope of Automatic Identification and Data Capture (AIDC).

What is meant by "tag" is in particular:
- an electronic tag such as a radio-frequency identification (RFID) tag, or
- an optical tag such as a bar code.

Tags of biometric type, optical character recognition tags, magnetic strips, etc., can also be cited. Such tags enable traceability of the identified object. The term "object" is to be understood as being a real object, for example a product, or a virtual object, for example an activity. Accordingly, handling, storing, sorting, order preparation, electronic traceability of livestock or domestic animals, or access control applications are in particular envisaged.

STATE OF THE ART

A device known from the state of the art, in particular from the document U.S. Pat. No. 8,832,323, comprises:
- a data capture module, configured to capture data from the tag of the object;
- a case comprising a first housing demarcating a first accommodating volume designed to receive a smartphone, the case being fixed to the data capture module;
- wireless connection means designed to connect the data capture module to the smartphone.

Such a state-of-the-art device is not entirely satisfactory in so far as the data capture module is not protected if the device is dropped. Furthermore, in operation, the device is handled by the user via the data capture module, which is not necessarily designed to be ergonomic, on account of its main technical function. It is then desirable to design an ergonomic shape of the data capture module in order to ensure easy handling of the device by the user, which makes manufacturing more complex and increases the related costs.

SUMMARY OF THE INVENTION

Accordingly, the object of the present invention is to wholly or partially remedy the above-mentioned shortcomings, and relates for this purpose to an identification device of an object comprising a tag, the device comprising:
- a case comprising a first housing demarcating a first accommodating volume designed to receive a PDA phone;
- a data capture module configured to capture data from the tag of the object;
- connection means configured to electrically connect the data capture module and the PDA phone;

the device being remarkable in that the case comprises a second housing demarcating a second accommodating volume, and in that the data capture module is arranged inside the housing, in the second accommodating volume.

Accordingly, such a device according to the invention enables the data capture module to be protected by means of the case if it falls. Furthermore, it is not necessary to design an ergonomic shape of the data capture module in so far as the device in operation is held by the user via the case, which enables manufacturing costs to be reduced in comparison with the state of the art. Furthermore, such a case enables the PDA phone and the data capture module to be secured to one another in ergonomic manner and enables an interchangeability of both the PDA phone and the data capture module. Such a device according to the invention forms a mobile data capture terminal.

What is meant by "PDA phone" is a mobile electronic apparatus which, by radioelectric means, performs communication functions such as telephony and/or internet access, as well as computer or multimedia functions. The term "PDA phone" in particular covers a smartphone or a touchpad.

Advantageously, the device comprises a radio-identification antenna mounted on the case, the radio-identification antenna being configured to cooperate with the data capture module.

Accordingly, the fact that the radio-identification antenna is mounted on the case makes it possible to have a single compliance certification with respect to the radio-frequency electromagnetic compatibility of the data capture module.

Advantageously, the connection means are mounted on the case.

Accordingly, such a case enables a physical connection between the PDA phone and the data capture module. What is meant by "physical connection" is a hardwired electric connection.

According to one form of execution, the connection means comprise:
- a first physical connector designed to make an electric connection with the PDA phone;
- a second physical connector designed to make an electric connection with the data capture module.

Advantageously, the first and second housings are superposed or juxtaposed.

Accordingly, such arrangements of the first and second housings facilitate handling of the device by the user.

Advantageously, the device comprises first guide means arranged to guide the PDA phone inside the first housing.

According to an alternative, the device comprises first clip-fastening means arranged to clip the PDA phone inside the first housing.

Advantageously, the device comprises second guide means arranged to guide the data capture module inside the second housing.

According to an alternative, the device comprises second clip-fastening means arranged to clip the data capture module inside the second housing.

Accordingly, such first and second guide means simplify the interchangeability of the PDA phone and of the data capture module.

The first and second clip-fastening means are advantageously configured to obtain reversible clip-fastening (i.e. non-destructive for the clip-fastening means) respectively of the PDA phone and of the data capture module inside the first and second housings. Accordingly, such first and second clip-fastening means simplify the interchangeability of the PDA phone and of the data capture module.

According to a variant, the device comprises first and second compartments mounted sliding relatively to the case and respectively forming the first and second housings.

Accordingly, such first and second compartments simplify the interchangeability of the PDA phone and of the data capture module.

Advantageously, the connection means comprise a charge management unit of the batteries of the PDA phone and of the data capture module.

Accordingly, such a management unit enables the consumption of the device to be optimised. The battery of the PDA phone can make use of the energy of the battery of the data capture module, and vice versa.

Advantageously, the case comprises a third housing demarcating a third accommodating volume, and the device comprises a payment terminal arranged inside the third housing, in the third accommodating volume.

Accordingly, such a device further forms a Mobile Point of Sale (MPOS).

BRIEF DESCRIPTION OF THE DRAWINGS

Other features and advantages will become apparent from the following description of different embodiments of the invention, given for non-restrictive example purposes only, with reference to the appended drawings in which.

DETAILED DESCRIPTION OF THE EMBODIMENTS

Figure 1:
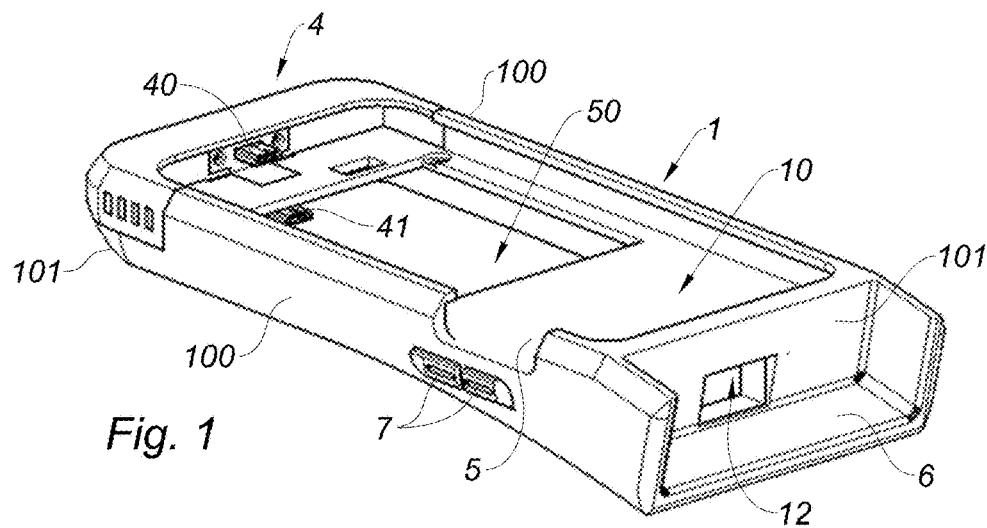
FIG. 1 is a schematic perspective view of a case belonging to a device according to the invention.
Figure 2:
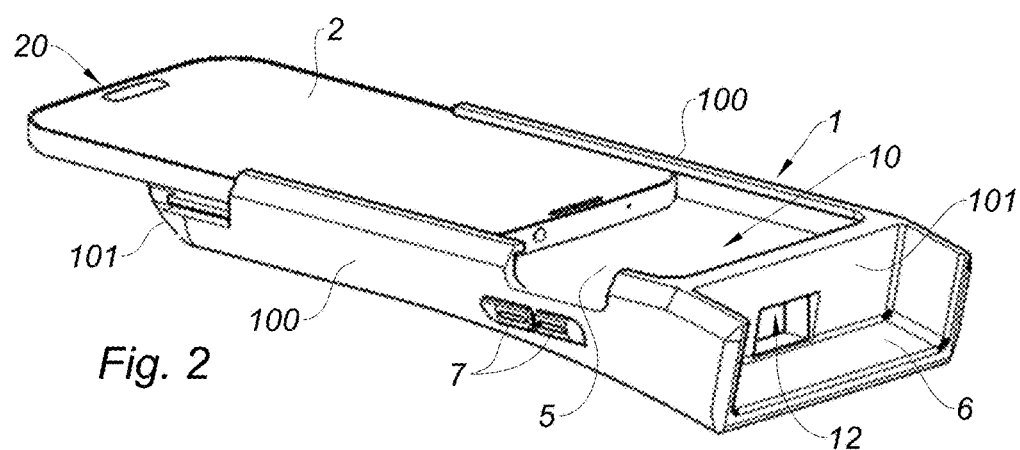
FIG. 2 is a schematic perspective view of the case illustrated in FIG. 1, equipped with a PDA phone.

For the different embodiments, the same reference numerals will be used for parts that are identical or that perform the same function, for the sake of simplification of the description. The technical features described hereafter for different embodiments are to be considered either alone or in any technically possible combination.

The device illustrated in FIGS. 1 to 6 is an identification device of an object comprising a tag, the device comprising:
- a case 1 comprising a first housing 10 demarcating a first accommodating volume designed to receive a PDA phone 2;
- a data capture module 3 configured to capture data from the tag of the object;
- connection means 4 configured to electrically connect the data capture module 3 and the PDA phone 2.

The case 1 comprises a second housing 11 demarcating a second accommodating volume.

Figure 3:
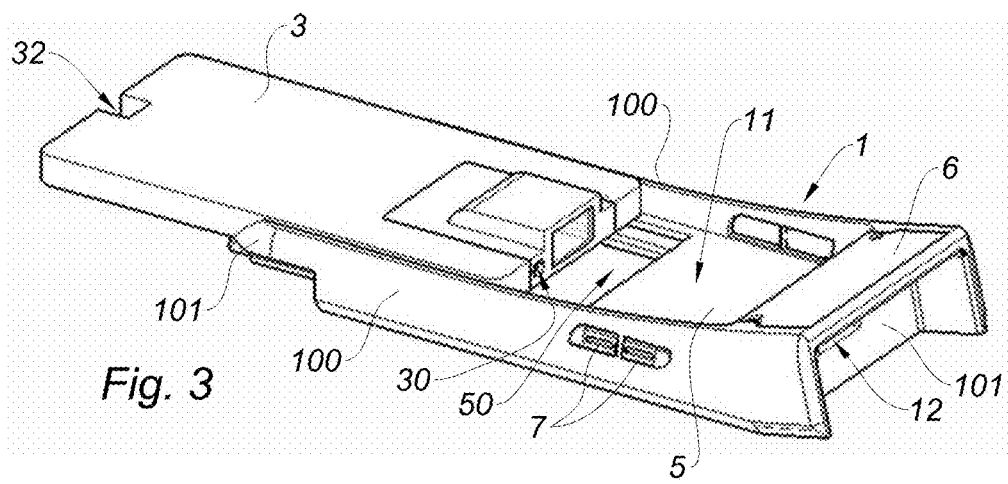
FIG. 3 is a schematic perspective view of the case illustrated in FIG. 1, turned over and equipped with a data capture module.
Figure 4:
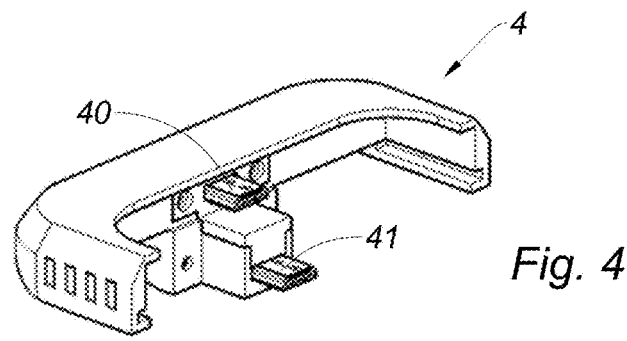
FIG. 4 is a partial schematic view of the case illustrated in FIG. 1, representing connection means configured to electrically connect the data capture module and the PDA phone.

As illustrated in FIG. 3, the data capture module 3 is arranged inside the second housing 11, in the second accommodating volume.

The case 1 advantageously comprises two opposite longitudinal edges 100 connected to one another by two opposite lateral edges 101. The case 1 advantageously comprises a partition 5 extending between the two longitudinal edges 100 and between the lateral edges 101 so as to form the first housing 10 and second housing 11 on each side of the partition 5, the first and second housings 10, 11 being superposed. The first and second housings 10, 11 are advantageously shaped to snugly follow the outlines respectively of the PDA phone 2 and of the data capture module 3. The partition 5 is advantageously provided with an opening 50 so as to make the first and second housings 10, 11 communicate with one another. The opening 50 is advantageously shaped to insert the battery 33 of the data capture module 3. The case 1 is advantageously made from plastic material, preferably by 3D printing.

The partition 5 and longitudinal edges 100 advantageously form a slide enabling the PDA phone 2 to be guided inside the first housing 10 and the data capture module 3 to be guided inside the second housing 11. This results in the PDA phone 2 and data capture module 3 being mounted movable relatively to the case 1. A lateral edge 101 of the case 1 advantageously forms a stop for the PDA phone 2.

According to a variant, the device comprises first and second compartments mounted sliding relatively to the case 1 and respectively forming the first and second housings 10, 11.

According to another variant, the device comprises first clip-fastening means arranged to clip the PDA phone 2 inside the first housing 10. The first clip-fastening means are advantageously configured to obtain reversible clip-fastening (i.e. non-destructive for the first clip-fastening means) of the PDA phone 2 inside the first housing 10. The first clip-fastening means preferably comprise:
- a flexible lug, that is preferably elastically deformable;
- a prong, arranged at one end of the flexible lug.

Such first clip-fastening means enable quick and easy insertion and changing of the PDA phone 2. The first clip-fastening means are preferentially arranged at the ends and/or along the length of the first housing 10. In other words, the first clip-fastening means are preferentially arranged on the lateral edges 101 and/or on the longitudinal edges 100 of the case 1, and are directed towards the inside of the first housing 10.

The device can also comprise second clip-fastening means arranged to clip the data capture module 3 inside the second housing 11. The second clip-fastening means are advantageously configured to obtain reversible clip-fastening (i.e. non-destructive for the second clip-fastening means) of the data capture module 3 in the second housing 11. The second clip-fastening means preferably comprise:
- a flexible lug, that is preferably elastically deformable;
- a prong, arranged at one end of the flexible lug.

Such second clip-fastening means enable quick and easy insertion and changing of the data capture module 3. The second clip-fastening means are preferentially arranged at the ends and/or along the length of the second housing 11. In other words, the second clip-fastening means are preferentially arranged on the lateral edges 101 and/or on the longitudinal edges of the case 1, and are directed towards the inside of the second housing 11.

The case 1 advantageously comprises an opening 12 arranged in a lateral edge 101. The opening 12 is advantageously shaped to leave visibility for an optical tag reader of the data capture module 3. The device advantageously comprises at least one radio-identification antenna 6 mounted on the case 1. More precisely, the case 1 comprises an outer part presenting a U-shaped transverse cross-section, the outer part extending from a lateral edge 101. The radio-identification antenna 6 is preferentially mounted on the outer part of the case 1. The case 1 and radio-identification antenna 6 advantageously form a single part. The radio-identification antenna 6 is advantageously moulded with the case 1, for example by means of the Moulded Interconnect Device (MID) technology, when the case 1 is made from plastic material. The radio-identification antenna 6 is advantageously configured to collaborate with the data capture module 3. In this respect, an internal antenna connector is advantageously associated with the or with each radio-identification antenna 6.

The device advantageously comprises control buttons 7 extending on a longitudinal edge 100 of the case 1. The buttons 7 advantageously form extensions of a control button of the PDA phone 2.

The PDA phone 2 is advantageously a pocket terminal (such as a smartphone or a pocket electronic assistant), or a touchpad. The PDA phone 2 enables display of actions and data, and also navigation in a software and data entry. The PDA phone 2 is advantageously used with its own man-machine interface (keypad and screen, which may be touch-sensitive) which forms the man-machine interface of the device. The device advantageously uses radio-frequency data communication means of the PDA phone 2 in order to exchange data with a remote server and a database.

The PDA phone 2 advantageously comprises a connector 20 designed to cooperate with the connection means 4.

The data capture module 3 is advantageously suitable for the RFID UHF technology (ISO/IEC 18000-6C standard) and for 1D/2D barcode reading. However, as non-restrictive examples, the data capture module 3 can also be adapted to the RFID ISO/IEC 18000-3, ISO/IEC 18000-2, ISO/IEC 14443, ISO/IEC 15693, ISO/IEC 18092, ISO/IEC 14223, ISO/IEC 11784 or ISO/IEC 11785 standards.

Figure 5:
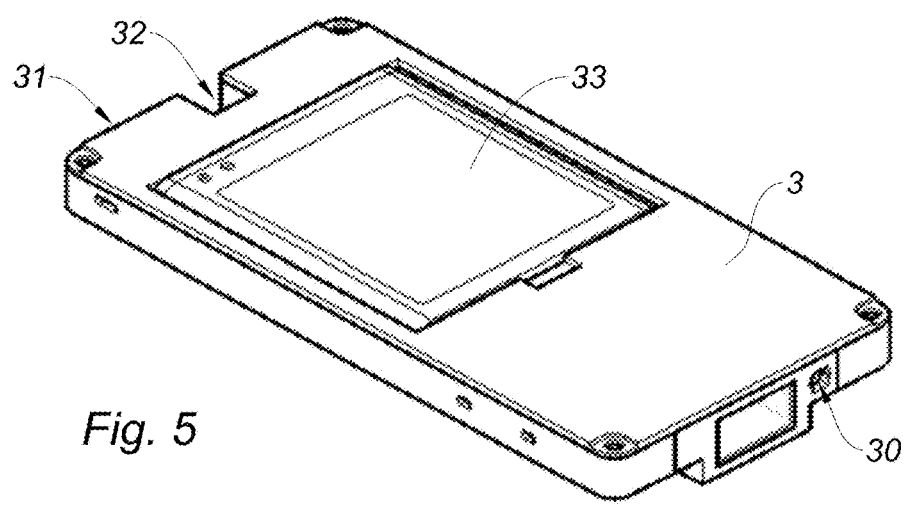
FIG. 5 is a schematic view of a data capture module equipping a device according to the invention.

As illustrated in FIGS. 3 and 5, the data capture module 3 advantageously comprises at least one radio-frequency connector 30 configured to electrically connect the data capture module 3 and the radio-identification antenna or antennas 6, via at least one internal antenna connector. The data capture module 3 advantageously comprises a USB connector 31 to enable charging of the batteries of the data capture module 3 and of the PDA phone 2 (the battery 33 of the data capture module 3 can be seen in FIG. 5), and retrieval of the identification data of the tag for transmission to a computer via a hardwired connection without having to remove the PDA phone 2. The data capture module 3 advantageously comprises a connector 32 designed to cooperate with the connection means 4.

The data capture module 3 is advantageously configured to execute write/read requests of the tags such as radio-tags or barcodes so as to respectively generate a radio-frequency or optical signal comprising the requests, the signal being transmitted to the radio-identification antenna 6.

The connection means 4 are advantageously mounted on the case 1. The connection means form a connection module. More precisely, the connection means 4 are advantageously mounted on a lateral edge 101 of the case 1. The connection means 4 are advantageously mounted on the case 1 so as to keep the PDA phone 2 in position inside the first housing 10.

The connection means 4 advantageously comprise:
a first physical connector 40 designed to provide an electric connection with the PDA phone 2, via the connector 20;
a second physical connector 41 designed to provide an electric connection with the data capture module 3, via the connector 32;
a computer bus connecting the first and second physical connectors 40, 41.

The device advantageously comprises a charge management unit of the battery of the PDA phone 2 and of the battery 33 of the data capture module 3. Such a management unit preferentially equips the data capture module 3.

The device advantageously comprises a microcontroller-based card connected to the management unit. The microcontroller-based card preferentially equips the data capture module 3. The microcontroller-based card enables the charging operations of the battery of the PDA phone 2 and of the battery 33 of the data capture module 3 to be performed, and also enables data transfer operations to a computer, as well as the write/read operations of the tags such as RFID tags or barcodes.

Figure 6:
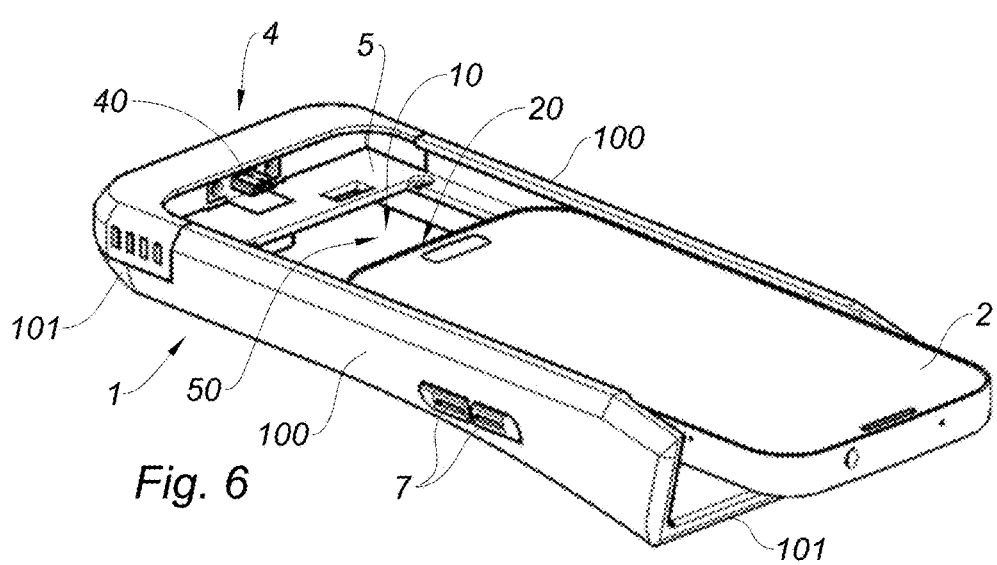
FIG. 6 is a schematic perspective view of a case belonging to a device according to a second embodiment and equipped with a PDA phone.

In the embodiment illustrated in FIG. 6, the lateral edge 101 forming a stop is absent so that the PDA phone 2 can be inserted inside the first housing 10 by simple sliding.

The case 1 advantageously comprises a third housing demarcating the third accommodating volume. The device advantageously comprises a payment terminal arranged inside the third housing, in the third accommodating volume. The first, second and third housings are advantageously superposed. According to a variant, the first and second housings 10, 11 are juxtaposed and located above the third housing. As a non-restrictive example, one envisaged application of the device is retail commerce. Securing the data capture module 3, PDA phone 2 and payment terminal to one another enables a sales person to electronically identify a product, to advise a customer on his choice of product by means of an application on the PDA phone 2 and to cash the sale of the product.

The invention claimed is:

1. Identification device of an object comprising a tag, the identification device comprising:
a case defining a first housing demarcating a first accommodating volume designed to receive a PDA phone a second housing demarcating a second accommodating volume designed to receive a data capture module;
a data capture module configured to capture data from the tag of the object, the data capture module being arranged inside the second housing, in the second accommodating volume;
connector configured to electrically connect the data capture module and the PDA phone; and
a radio-identification antenna mounted on the case, the radio-identification antenna being configured to cooperate with the data capture module.

2. Identification device according to claim 1, wherein the connector is mounted on the case.

3. Identification device according to claim 1, wherein the connector comprises:
a first physical connector designed to make an electric connection with the PDA phone;
a second physical connector designed to make an electric connection with the data capture module.

4. Identification device according to claim 1, wherein the first and second housings are superposed or juxtaposed.

5. Identification device according to claim 1, comprising a first guide arranged to guide the PDA phone inside the first housing.

6. Identification device according to claim 1, comprising a first clip-fastener arranged to clip the PDA phone inside the first housing.

7. Identification device according to claim 1, comprising a second guide arranged to guide the data capture module inside the second housing.

8. Identification device according to claim 1, comprising a clip-fastener arranged to clip the data capture module inside the second housing.

9. Identification device according to claim 1, comprising first and second compartments mounted sliding relatively to the case and respectively forming the first and second housings.

10. Identification device according to claim 1, wherein the connector comprises a charge management unit of the batteries of the PDA phone and of the data capture module the charge management unit being configured to manage charge between the battery of the PDA phone and the battery of the data capture module.

11. Identification device according to claim 1, comprising a third housing demarcating a third accommodating volume, and a payment terminal arranged inside the third housing, in the third accommodating volume.

12. Identification device of an object comprising a tag, the identification device comprising:
- a case defining a first housing demarcating a first accommodating volume designed to receive a PDA phone a second housing demarcating a second accommodating volume designed to receive a data capture module;
- a data capture module configured to capture data from the tag of the object, the data capture module being arranged inside the second housing, in the second accommodating volume;
- connector configured to electrically connect the data capture module and the PDA phone; and
- a first guide arranged to guide the PDA phone inside the first housing or arranged to guide the data capture module inside the second housing.

13. Identification device of an object comprising a tag, the identification device comprising:
- a case defining a first housing demarcating a first accommodating volume designed to receive a PDA phone a second housing demarcating a second accommodating volume designed to receive a data capture module;
- a data capture module configured to capture data from the tag of the object, the data capture module being arranged inside the second housing, in the second accommodating volume;
- connector configured to electrically connect the data capture module and the PDA phone; and
- first and second compartments mounted sliding relatively to the case and respectively forming the first and second housings.

14. Identification device of an object comprising a tag, the identification device comprising:
- a case defining a first housing demarcating a first accommodating volume designed to receive a PDA phone a second housing demarcating a second accommodating volume designed to receive a data capture module;
- a data capture module configured to capture data from the tag of the object, the data capture module being arranged inside the second housing, in the second accommodating volume;
- connector configured to electrically connect the data capture module and the PDA phone; and
- a third housing demarcating a third accommodating volume, and a payment terminal arranged inside the third housing, in the third accommodating volume.

15. Identification device of an object comprising a tag, the identification device comprising:
- a case defining a first housing demarcating a first accommodating volume designed to receive a PDA phone a second housing demarcating a second accommodating volume designed to receive a data capture module;
- a data capture module configured to capture data from the tag of the object, the data capture module being arranged inside the second housing, in the second accommodating volume;
- connector configured to electrically connect the data capture module and the PDA phone; and
- a guide arranged to guide the data capture module inside the second housing,
- and wherein the connector comprises a charge management unit of the batteries of the PDA phone and of the data capture module the charge management unit being configured to manage charge between the battery of the PDA phone and the battery of the data capture module.

* * * * *